United States Patent [19]

Ishida et al.

[11] Patent Number: 5,679,305
[45] Date of Patent: Oct. 21, 1997

[54] PROCESS FOR INJECTION MOLDING OF PHENOLIC RESIN MOLDING MATERIAL

[75] Inventors: Tamotsu Ishida; Eiji Funatsu, both of Fujieda, Japan

[73] Assignee: Sumitomo Bakelite Company Limited, Tokyo, Japan

[21] Appl. No.: 508,993

[22] Filed: Jul. 28, 1995

[30] Foreign Application Priority Data

Aug. 8, 1994 [JP] Japan .................. 6-186109
Aug. 8, 1994 [JP] Japan .................. 6-186110
Aug. 8, 1994 [JP] Japan .................. 6-186111

[51] Int. Cl.$^6$ .......................... B29C 45/00; B29C 45/60
[52] U.S. Cl. .................. 264/328.2; 264/328.18; 264/331.22
[58] Field of Search .............. 264/328.2, 328.18, 264/331.22

[56] References Cited

U.S. PATENT DOCUMENTS 4,263,248  4/1981  Annis .................. 264/328.2

*Primary Examiner*—Leo B. Tentoni
*Attorney, Agent, or Firm*—Browdy and Neimark

[57] ABSTRACT

The present invention provides a process for injection molding a phenolic resin molding material which includes injection molding a phenolic resin molding material having a melt viscosity of $10^4$ Pa·s or lower, preferably $10^3$ Pa·s or lower at 100° C. by an injection molding machine having a screw of 1.5 or higher in compression ratio and/or provided with a back-flow stopping ring at the tip portion of the screw.

According to the present invention, it is possible to carry out injection molding of phenolic resin molding materials with injection molding machines generally used for molding of thermoplastic resins by employing phenolic resin molding materials which are low in viscosity in molten state. Furthermore, the injection molding can be carried out under relatively low pressure and thus, occurrence of flash can be inhibited.

8 Claims, 2 Drawing Sheets

PROCESS FOR INJECTION MOLDING OF PHENOLIC RESIN MOLDING MATERIAL

BACKGROUND OF THE INVENTION

1. Field of the Invention

The present invention relates to a process for injection molding a phenolic resin molding material and particularly, to a process for injection molding according to which molded articles can be obtained with formation of less flash under molding pressure lower than that in molding of usual phenolic resin molding materials by using phenolic resin molding materials excellent in heat stability in the injection cylinder and excellent in moldability.

2. Related Art Statement

Phenolic resin molding materials are excellent in balancing of heat resistance, electric characteristics, mechanical characteristics, dimensional stability, etc. and are utilized in various fields such as electric parts. In general, phenolic resin molding materials are molded by injection molding, but they increase in viscosity with proceeding of curing reaction of the resins in molten state heated at 90°–120° C. in the cylinder of an injection molding machine, and, as a result, they lose fluidity. Thus, since molten phenolic resins are low in heat stability, it is necessary to reduce as much as possible the generation of heat of the resins in the cylinder of an injection molding machine. When an injection molding machine having a large L/D (length to diameter) ratio of its screw (generally L/D=18–20) is used for plasticizing and melting phenolic resin molding materials, generation of heat is large and curing reaction of the resin proceeds, resulting in curing of the resin in the injection cylinder and injection cannot be carried out.

For this reason, in general, it is necessary for molding phenolic resin molding materials to use a full-flighted screw having a relatively small L/D ratio and having a compression ratio=1 and provided with no back-flow stopping ring and to use an injection molding machine provided with a mechanism to inhibit generation of heat as much as possible at the time of plasticizing, for example, a water cooling jacket provided at the injection cylinder. Furthermore, general phenolic resin molding materials have a relatively high viscosity even when they are heated to 90°–120° C. and molten in the cylinder and their viscosity rapidly increases with curing at the stage where they are injected into a mold of about 160°–180° C. for curing. Therefore, the time for which the fluidity is maintained is very short. Accordingly, in order to obtain good molded articles, the molten resin must be injected and poured into a mold in a short time under a high pressure, and this tends to cause fluctuation in the injection amount due to back-flowing of the molten resin in the cylinder and, furthermore, flash and distortion in the molded articles due to the internal stress are apt to occur.

3. Object of the Invention

The present invention has been accomplished as a result of extensive research to solve the above defects, and the object of the present invention is to provide a process for injection molding a phenolic resin molding material with injection molding machines generally employed for molding of thermoplastic resin molding materials by using a phenolic resin molding material having an excellent heat stability in molten state in the cylinder at the time of injection molding and a low viscosity in molten state, whereby the phenolic resin molding material can be molded under a lower pressure as compared with molding of usual phenolic resin molding materials, and thus, molded articles having less flash can be obtained.

SUMMARY OF THE INVENTION

The present invention relates to a process for injection molding of a phenolic resin molding material, characterized by injection molding a phenolic resin molding material having a melt viscosity of $10^4$ Pa·s or lower, preferably $10^3$ Pa·s or lower at 100° C. by an injection molding machine having a screw which has a compression ratio of 1.5 or higher and/or is provided with a back-flow stopping ring at the tip portion thereof.

DETAILED DESCRIPTION OF THE INVENTION

Figure 1:
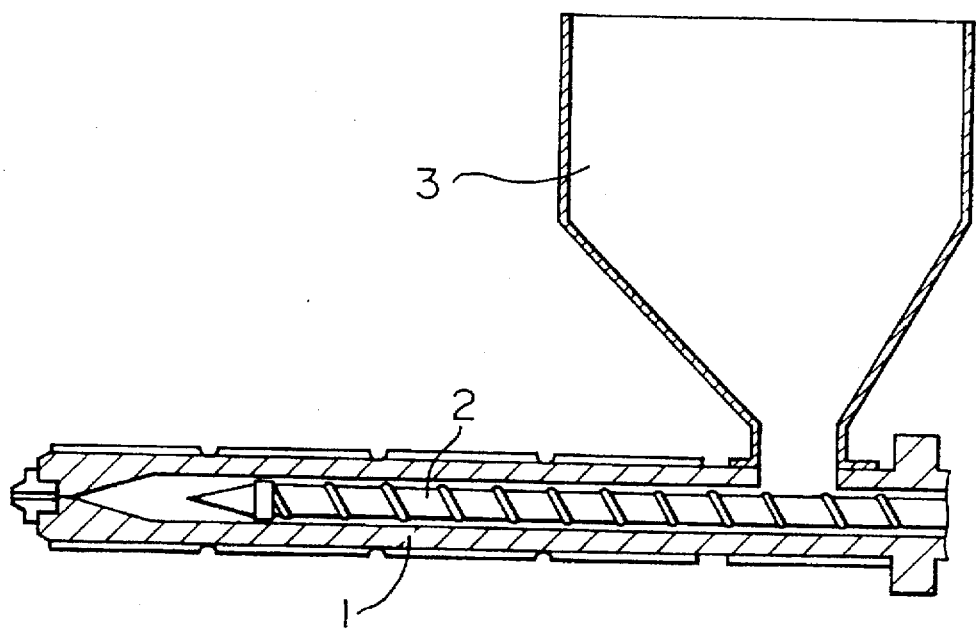
FIG. 1 is a schematic sectional view of a cylinder and a screw part in the injection molding machine.

The compression ratio of the screw and the back-flow stopping ring will be explained. FIG.1 is a schematic sectional view of a cylinder and a screw part in the injection molding machine. The reference number 1 indicates a cylinder, 2 indicates a screw and 3 indicates a hopper.

The molding material introduced into the hopper 3 is transferred forward (from the right to the left in FIG. 1) by the screw 2 while being melted by the heated cylinder 1.

Figure 2:
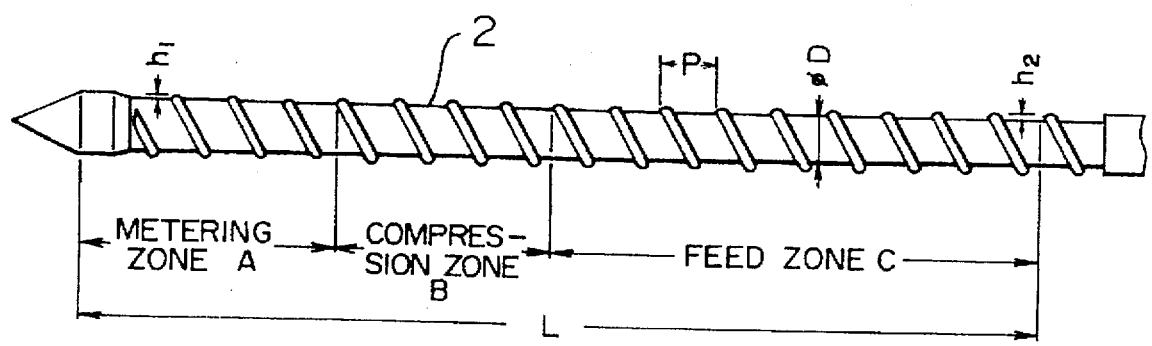
FIG. 2 is a side view of the screw shown in FIG. 1 for explaining the compression ratio.

FIG. 2 is a side view of the screw shown for explaining the compression ratio. In FIG. 2, D indicates a diameter of the screw, $h_1$ indicates a channel depth in metering zone A, $h_2$ indicates a channel depth in feeding zone C, and compression ratio $\epsilon$ is shown by the following formula.

$$\epsilon = h_2(D-h_2)/h_1(D-h_1)$$

The molding material introduced into the hopper is sent forward from the feed zone C, begins to melt in the vicinity of the start of the compression zone B and becomes the molten molding material in the metering zone A. When the screw has a compression ration of more than 1, the molding material is compressed as it is sent forward, so that the molding material is easily melted, sufficiently kneaded and simultaneously prevented from back-flowing.

In the present invention, when the back-flow stopping ring is not provided, a screw having a compression ratio of 1.5 or higher is necessarily used. Even when the back-flow stopping ring is provided, the screw having a compression ratio of 1.5 or higher may also be used.

Figure 3A:
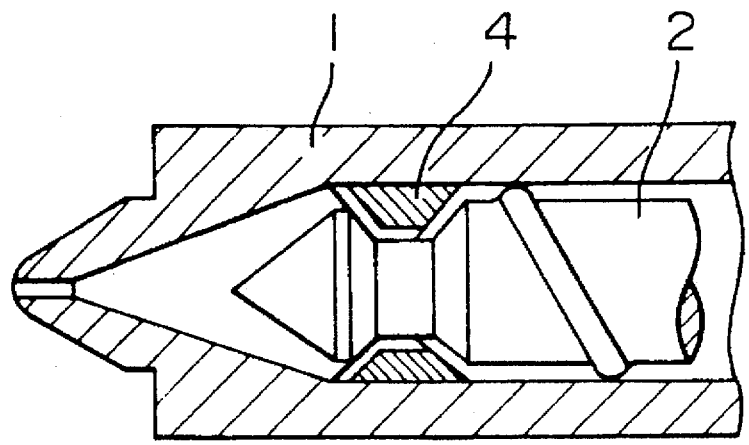
FIG. 3(a) shows one example of the side view of a tip portion of the screw provided with a back-flow stopping ring in which the position of the back-flow stopping ring at the time of plasticizing is shown.
Figure 3B:
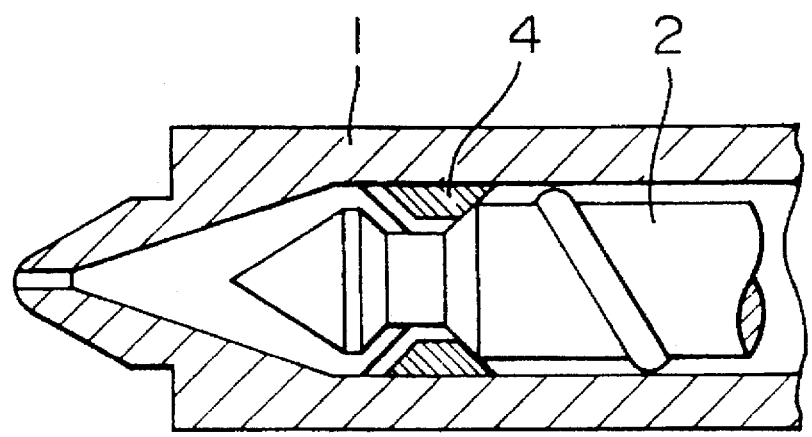
FIG. 3(b) shows one example of the side view of a tip portion of the screw provided with a back-flow stopping ring in which the position of the back-flow stopping ring at the time of injection is shown.

FIGS. 3(a) and 3(b) show one example of a side view of a tip portion of the screw provided with a back-flow stopping ring. The reference number 4 indicates the back-flow stopping ring. At the time of plastisizing the molding material, the back-flow stopping ring 4 is pushed forward by the pressure of the molding material, the material is transferred between this ring and the screw to the tip portion of the screw by rotation of the screw as shown in FIG. 3(a), and at the time of injection, the screw moves forward to carry out injection of the material into a mold. The back-flow stopping ring is pressed against the back screw wall by the injection pressure at the time of injection as shown in FIG. 3(b), whereby back-flow of the molding material is prevented.

As mentioned above, full-flighted screws having a compression ratio of 1 and having no back-flow stopping ring are generally employed for molding of phenolic resin molding materials. On the other hand, injection molding machines having a high compression ratio (e.g., higher than 1.5) of screw or provided with a back-flow stopping ring are used for molding of thermoplastic resins of relatively low melt viscosity.

The inventors have conducted investigation on various phenolic resin molding materials for applying the phenolic resin molding materials to the injection molding machines as used for molding of thermoplastic resin molding materials, and, as a result, have accomplished the present invention. The phenolic resin molding materials of low melt viscosity in the present invention can be injection molded under a pressure lower than the generally employed pressure (a pressure of ⅔ to ½ or lower of the generally employed pressure) and are effective for prevention of formation of flash in molded articles or for improvement of mold life. However, when they are molded by the above-mentioned injection molding machines having a full-flighted screw which are employed for the general phenolic resin molding materials, insufficient kneading or back-flow in injection occurs and this tends to cause short molding.

An example of phenolic resins used for phenolic resin molding materials (I) having a melt viscosity of $10^4$ Pa·s or lower at 100° C. is one which is smaller in molecular weight than phenolic resins used for general molding materials. General novolak type phenolic resins have a molecular weight [number-average molecular weight (this is the same hereinafter)] of 600–1000, while by employing a relatively small molecular weight of 350–500, heat stability of the resins in molten state is increased and fluidity in the mold is improved because of the low melt viscosity. The molecular weight may be smaller than 350, but the resins are difficult to become solid to cause deterioration of operability in preparation of molding materials. When the molecular weight is larger than 500, heat stability and fluidity decrease, and application of the present invention sometimes becomes difficult. The molecular weight is more preferably in the range of 380–450.

The ortho-/para-bond ratio (O/P ratio) of the novolak type phenolic resins is unlimited, and ordinary random novolak resins (O/P ratio: 0.6–0.9) and high ortho-novolak resins (O/P ratio: 1.0 or higher) can be used. However, use of high ortho-novolak resins of 1.5–2.5 in O/P ratio is preferred since activation energy of the resins increases and curability in the mold becomes superior. If the O/P ratio is lower than 1.5, curability in the mold tends to become insufficient, and if it is higher than 2.5, preparation of the resin per se is difficult. Preferred O/P ratio is 1.5–2.3.

The novolak resins used in the present invention are preferably those which are smaller in free phenol content. In the case of high ortho-novolak resins, the proportion of free phenol is usually about 7–10% by weight while in the present invention, it is preferably 6% by weight or less, more preferably 4% by weight or less. When the proportion of free phenol is more than 6% by weight, decomposition of hexamethylenetetramine is accelerated and the heat stability at 90°–120° C. decreases. However, it is not easy in preparing phenolic resins to reduce free phenol content to less than 1% by weight.

For such phenolic resin molding materials (I), it is preferred that the stable time in molten state at 100° C. is 250 seconds or more, and this can be attained by using the above-mentioned phenolic resins of lower molecular weight and less free phenol. Furthermore, when high ortho-novolak resins are used, the phenolic resin molding materials which suffice the above stability can be obtained by using no curing aids (such as calcium hydroxide) or by using a reduced amount of them.

In the present invention, melt viscosity of the phenolic resin molding materials at 100° C. is preferably $10^3$ Pa·s or lower, and as an example of the phenolic resin component used for such phenolic resin molding materials (II), preferred is a blend comprising a usual phenolic resin (having a molecular weight of 600–1000) and a crystalline phenolic compound low in viscosity when molten. For example, mention may be made of a phenolic resin molding material of low melt viscosity which consists of a blend of a resin component comprising a crystalline phenolic compound having two or more hydroxyphenyl groups and a phenolic resin, hermethylenetetramine and a filler as essential components, and moreover, a phenolic resin molding material of low melt viscosity comprising the above blend and a compound having two or more hydroxyl groups on benzene ring.

The crystalline phenolic compound having two or more hydroxyphenyl groups includes, for example, bisphenol compounds such as bisphenol A, bisphenol F, bisphenol AD, bisphenol Z and bisphenol S and derivatives thereof, biphenol and derivatives thereof, and phenolic compounds having three or four hydroxyphenyl groups. These may be used each alone or in combination of two or more. Such crystalline phenolic compound having two or more hydroxyphenyl groups is used for imparting to the phenolic resin molding materials such characteristics that they are solid at room temperature, rapidly melt by the plasticization at the time of injection molding to have a low viscosity, and can be molded under a pressure lower than the pressure for molding of usual molding materials. As the phenolic resins, there may be used ordinary novolak resins, but when novolak resins of lower molecular weight are used, the melt viscosity can be further lowered and, besides, amount of the expensive crystalline phenolic compound can be reduced. As the crystalline phenolic compound, preferred are bisphenol F and bisphenol A, and especially preferred is bisphenol F.

The compound having two or more hydroxyl groups on benzene ring is used for imparting the characteristics of improving the curing rate with keeping the low viscosity and without damaging the above-mentioned characteristics of the crystalline compound having two or more hydroxyphenyl groups. As examples of the compound, mention may be made of resorcin, hydroquinone, catechol, phloroglucinol, pyrogallol and derivatives thereof. These may be used each alone or in combination of two or more. Resorcin is especially preferred for acceleration of the curing.

In the present invention, the blending ratio of the crystalline phenolic compound (A) having two or more hydroxyphenyl groups and the phenolic resin (B) can be unlimitedly selected, but is preferably A/B=80/20–30/70. If the proportion of the component (A) is too small, the characteristics of the crystalline phenolic compound cannot be sufficiently exhibited, and if it is too large, curing rate is slow. With increase in the proportion of the component (B), viscosity of the molten resin increases and curability is improved, and therefore, it is preferred to add the component (B) in a suitable amount within the above range depending on the purpose. Moreover, the compound (C) having two or more hydroxyl groups on benzene ring is added for acceleration of curing, and its blending ratio is preferably selected to give the total amount of components (A) and (B)/the amount of component (C)=97/3–90/10. If the amount of the component (C) is smaller than the above range, the effect of acceleration of curing is low and if it is larger than the range, curability decreases.

For such phenolic resin molding materials (II), it is also preferred that the stable time in molten state at 100° C. is 250 seconds or more, and ordinarily, those which have a melt viscosity of $10^3$ Pa·s or lower at 100° C. sufficiently satisfy the above stable time.

Any other phenolic resin may also be used in the present invention as far as the melt viscosity of the resulting molding material satisfies $10^4$ Pa·s or lower, preferably $10^3$ Pa·s or lower.

As the fillers used in the phenolic resin molding materials of the present invention, there may be used, for example, one or more of organic powders such as wood meals, pulp powders, various fabric ground products, and ground products of phenolic resin laminates or phenolic resin molded articles, inorganic powders such as silica, alumina, aluminum hydroxide, glass, talc, clay, mica, calcium carbonate and carbon, and inorganic fibers such as glass fibers and carbon fibers. The proportion in the phenolic resin molding materials of the present invention is that the proportion of the resin component containing hexamethylenetetramine is 20–70% by weight and that of the filler is 80–30% by weight. Furthermore, the phenolic resin molding materials of the present invention may optionally contain various additives such as lubricants, colorants, curing accelerators and flame retardants.

The phenolic resin molding materials of the present invention can be prepared by blending the resin component, hexamethylenetetramine, fillers and other additives, kneading the blend by a roll mill, a twin-screw kneader or the like, and grinding the kneaded product. When the compound having two or more hydroxyl groups on benzene ring is added, it may be previously melt-mixed with other resin components and hexa-methylenetetramine or it may be kneaded together with the filler, etc. at the subsequent step. Addition of such a compound is preferred for maintaining superior rapid curability and low-pressure molding.

As mentioned above, the resin component used for obtaining the phenolic resin molding materials of the present invention is of low melt viscosity. In the case of standard blend composition of the phenolic resin molding materials, namely, that comprising 40–45% by weight of a resin component, 40–50% by weight of a filler (which includes 10–15% by weight of an inorganic filler) and 10–15% by weight of other additives, viscosity of the resin component is about 80 cst or lower for the molding materials (I) and about 40 cst or lower for the molding materials (II) as a viscosity of 50% ethanolic solution. The viscosity of the resin components such as phenolic resin explained hereinbefore is included within the range of this solution viscosity. On the other hand, phenolic resins generally used for ordinary phenolic resin molding materials have a viscosity of 90–100 cst or higher and a molecular weight of 600–1000, especially 600–800.

It is preferred to use novolak type phenolic resins having a molecular weight of 350–500 for obtaining the phenolic rein molding materials (I) of the present invention. Furthermore, the novolak type phenolic resins preferably have an O/P ratio of 1.5–2.5. Since these phenolic resins have a high activation energy and a low melt viscosity, they are excellent in heat stability in molten state at 90°–120° C. and excellent in curability at about 160°–200° C.

The phenolic resin molding materials (II) have a further lower viscosity in molten state at 90°–120° C. and are excellent in heat stability and excellent in curability at about 160°–200° C. The reason is not sufficiently clear, but it is considered that this is because the crystalline phenolic compound having two or more hydroxyphenyl groups and having a relatively small molecular weight melts rapidly and into very low viscosity state at 90°–120 C. and acceleration of curing is inhibited because of small shearing heat generation by screw, but because at a temperature higher than 160° C., decomposition of hexamethylenetetramine proceeds and, when a compound having two or more hydroxyl groups on benzene ring is present, the decomposition is further accelerated, which acts on the crystalline phenolic compound and the phenolic resin respectively to accelerate the curing reaction.

The above phenolic resin component is an example of those which are low in melt viscosity and are excellent in heat stability at 90°–120° C., and it is natural that the excellent moldability aimed at by the present invention can be obtained when the resulting phenolic resin molding materials satisfy the above melt viscosity and heat stability.

Thus, since the phenolic resin molding materials of the present invention are low in viscosity and excellent in heat stability, curing reaction in the cylinder of an injection molding machine is restrained, and there is not highly generated the heat which may occur by providing a backflow stopping ring at the tip portion of the screw or by increasing the compression ratio of the screw, and stable plasticization can be performed and on the other hand, curing can be rapidly carried out in a mold of high temperature.

DESCRIPTION OF PREFERRED EMBODIMENTS

The present invention will be explained by the following examples. The "part" in the blend composition is part by weight. Phenolic resin molding materials were obtained by kneading with a heating roll the blending components using the novolak resins and the blending ratio as shown in the upper columns of Tables 1–2. Melt viscosity of the resultant molding materials was measured. Furthermore, these molding materials were subjected to injection molding, and stability in the cylinder and continuous moldability were evaluated. The results are shown in the lower columns of Tables 1–2.

Methods of measurement:

1. Melt viscosity: This was measured by Shimadzu flow tester (CFT-500C manufactured by Shimadzu Corporation, Ltd.)
2. Heat stability: This was evaluated by measuring the time of from the melting to the curing of the material using Laboplastmill (Type C manufactured by Toyoseiki Co., Ltd.).
3. Stability in cylinder: This was measured in the following manner. A test piece of 60Φ×8 mm was prepared 20 times by continuous injection molding (injection temperature: 90° C., mold temperature: 180° C.), and thereafter the molding material was left in the cylinder in the state after metering, and injected after lapse of a certain time. When the injection molding was carried out with changing the leaving time, the longest leaving time required for the molten material starting to flow and being able to be sufficiently filled in the mold was obtained.
4. Continuous moldability: A test piece of 60Φ×8 mm was prepared 100 times by continuous injection molding (injection temperature: 90° C., mold temperature: 180° C.) under a given injection pressure, and the continuous moldability was evaluated by observing whether insufficient filling into the mold occurred or not.

5. Flash: A test piece of 60Φ×8 mm was prepared 5 times by injection molding (injection temperature: 90° C., mold temperature: 180° C.) under a given injection pressure, and whether flash occurred on the molded articles or not was visually judged.

6. Flexural strength: This was obtained in accordance with JIS K7203. A test piece (10×4×80 mm) was made by injection molding in the same manner as above.

TABLE 1

(Blending amount: part by weight)

| | Example | | | | Comparative Example | | | | | |
|---|---|---|---|---|---|---|---|---|---|---|
| | 1 | 2 | 3 | 4 | 1 | 2 | 3 | 4 | 5 | 6 |
| Novolak resin Number-average molecular weight | 405 | 395 | 850 | 850 | 405 | 550 | 420 | 420 | 850 | 850 |
| O/P ratio | 1.8 | 2.1 | 0.8 | 0.8 | 1.8 | 2.1 | 1.2 | 1.2 | 0.8 | 0.8 |
| Free phenol (wt. %) | 2.5 | 4.0 | 5.0 | 5.0 | 2.5 | 7.5 | 2.5 | 2.5 | 5.0 | 5.0 |
| Blending compositions | | | | | | | | | | |
| Novolak resin | 44 | 44 | 25 | 25 | 44 | 44 | 44 | 44 | 44 | 44 |
| Bisphenol F | | | 15 | 15 | | | | | | |
| Hexamethylene-tetramine | 7 | 7 | 7 | 7 | 7 | 7 | 7 | 7 | 7 | 7 |
| Calcium hydroxide | | | 4 | 4 | | | | 3 | 3 | 3 |
| Resorcin | | | | 3 | | | | | | |
| Woodmeal, etc. | 49 | 49 | 49 | 46 | 49 | 49 | 49 | 46 | 49 | 49 |
| Molding/ conditions | | | | | | | | | | |
| Compression ratio of screw | 2.0 | 2.0 | 2.0 | 2.0 | 1.0 | 2.0 | 2.0 | 1.0 | 2.0 | 1.0 |
| Back-flow stopping ring | not provided | not provided | not provided | not provided | not provided | not provided | not provided | not provided | not provided | not provided |
| Injection pressure (kgf/cm$^2$) | 700 | 700 | 300 | 400 | 700 | 1500 | 1500 | 1200 | 1500 | 1000 |
| Properties | | | | | | | | | | |
| Melt viscosity 100° C. (Pa · s) | $2 \times 10^3$ | $3 \times 10^3$ | $2 \times 10^2$ | $5 \times 10^2$ | $2 \times 10^3$ | $5 \times 10^4$ | $3 \times 10^4$ | $1 \times 10^4$ | $3 \times 10^4$ | $3 \times 10^4$ |
| Heat stability 100° C. (sec) | 410 | 380 | 620 | 570 | 410 | 150 | 250 | 130 | 150 | 150 |
| Stability in cylinder (min) | 15 | 15 | 15 | 10 | 30 | 1 | 3 | 3 | 1 | 5 |
| Continuous moldability | o | o | o | o | o | x | x | o | x | o |
| Flash | o | o | o | o | x | — | — | x | — | x |
| Flexural strength (MPa) | 85 | 83 | 80 | 83 | 70 | — | — | 88 | — | 85 |

Continuous moldability: o good, x unmoldable
Flash: o very little flash occurred, x much flash occurred

TABLE 2

(Blending amount: part by weight)

| | Example | | | | | | Comparative Example | | | | |
|---|---|---|---|---|---|---|---|---|---|---|---|
| | 5 | 6 | 7 | 8 | 9 | 10 | 7 | 8 | 9 | 10 | 11 |
| Novolak resin Number-average molecular weight | 405 | 405 | 395 | 850 | 850 | 850 | 405 | 405 | 850 | 850 | 405 |
| O/P ratio | 1.8 | 1.8 | 2.1 | 0.8 | 0.8 | 0.8 | 1.8 | 1.8 | 0.8 | 0.8 | 1.8 |
| Free phenol (wt. %) | 2.5 | 2.5 | 4.0 | 5.0 | 5.0 | 5.0 | 2.5 | 2.5 | 5.0 | 5.0 | 2.5 |
| Blending compositions | | | | | | | | | | | |
| Novolak resin | 44 | 44 | 44 | 25 | 25 | 25 | 44 | 44 | 44 | 44 | 25 |
| Bisphenol F | | | | 15 | 15 | 15 | | | | | 15 |
| Hexamethylene-tetramine | 7 | 7 | 7 | 7 | 7 | 7 | 7 | 7 | 7 | 7 | 7 |
| Calcium hydroxide | | | | 4 | 4 | 4 | 3 | 3 | 3 | 3 | 4 |
| Resorcin | | | | | | 3 | | | | | 3 |
| Woodmeal, etc. | 49 | 49 | 49 | 49 | 49 | 46 | 46 | 46 | 46 | 46 | 46 |
| Molding/ conditions | | | | | | | | | | | |

TABLE 2-continued

| | Example | | | | | | (Blending amount: part by weight) Comparative Example | | | | |
|---|---|---|---|---|---|---|---|---|---|---|---|
| | 5 | 6 | 7 | 8 | 9 | 10 | 7 | 8 | 9 | 10 | 11 |
| Compression ratio of screw | 2.0 | 1.0 | 2.0 | 2.0 | 1.0 | 2.0 | 2.0 | 1.0 | 2.0 | 1.0 | 1.0 |
| Back-flow stopping ring | provided | provided | provided | provided | provided | provided | provided | not provided | provided | not provided | not provided |
| Injection pressure (kgf/cm$^2$) | 700 | 600 | 700 | 300 | 250 | 300 | 1500 | 1500 | 1500 | 1200 | 300 |
| Properties | | | | | | | | | | | |
| Melt viscosity 100° C. (Pa · s) | $2 \times 10^3$ | $2 \times 10^3$ | $3 \times 10^3$ | $2 \times 10^2$ | $2 \times 10^2$ | $5 \times 10^2$ | $1 \times 10^5$ | $1 \times 10^5$ | $5 \times 10^4$ | $5 \times 10^4$ | $2 \times 10^2$ |
| Heat stability 100° C. (sec) | 410 | 410 | 380 | 620 | 620 | 570 | 150 | 150 | 180 | 180 | 570 |
| Stability in cylinder (min) | 15 | 20 | 15 | 15 | 20 | 10 | 1 | 3 | 1 | 5 | 30 |
| Continuous moldability | o | o | o | o | o | o | x | o | x | o | o |
| Flash | o | o | o | o | o | o | — | x | — | x | x |
| Flexural strength (MPa) | 85 | 80 | 83 | 78 | 77 | 85 | — | 83 | — | 85 | 67 |

Continuous moldability: o good, x unmoldable
Flash: o very little flash occurred, x much flash occurred In the above examples and comparative examples, the injection molding machine having a screw of 2.0 in compression ratio and the injection molding machine having a screw provided with a back-flow stopping ring are those which are generally used for molding of thermoplastic resin molding materials, and the injection molding machines in the comparative examples which have a screw of 1.0 in compression ratio and provided with no back-flow stopping ring are those which are generally used for molding of thermosetting resin molding materials such as phenolic resins.

As clear from Tables 1-2, according to the present invention, it has become possible by using phenolic resin molding materials lower in viscosity in molten state and superior in heat stability in molten state to carry out good continuous injection molding of the phenolic resin molding materials with injection molding machines having a high compression ratio of screw and/or provided with a back-flow stopping ring at the tip portion of screw which are used for molding of thermoplastic resins. Furthermore, it has become possible to carry out injection molding under a relatively low pressure and to prevent formation of flash.

What is claimed is:

1. A process of injection molding a phenolic resin molding material which comprises injection molding a phenolic resin molding material having a melt viscosity of no more than $10^4$ Pa•s at 100° C. by an injection molding machine having a screw of at least 1.5 in compression ratio and/or provided with a back-flow stopping ring at the tip portion of the screw.

2. A process according to claim 1, wherein the phenolic resin molding material has a stable time of at least 250 seconds in molten state at 100° C.

3. A process according to claim 2, wherein the phenolic resin molding material contains a novolak type phenolic resin having a number-average molecular weight of 350–500 as a resin component.

4. A process according to claim 3, wherein the phenolic resin is a high ortho-novolak resin having an ortho-/para-bonding ratio of 1.5–2.5.

5. A process according to claim 4, wherein the phenolic resin has a free phenol content of no more than 6% by weight.

6. A process according to claim 1, wherein the phenolic resin molding material has a melt viscosity at 100° C. of no more than $10^3$ Pa•s.

7. A process according to claim 6, wherein the phenolic resin molding material comprises as essential components a resin component comprising a crystalline phenolic compound having at least two hydroxyphenyl groups and a phenolic resin, hexamethylenetetramine and a filler.

8. A process according to claim 7, wherein the phenolic resin molding material further contains a compound having at least two hydroxyl groups on benzene ring.

* * * * *